US010066732B2

(12) United States Patent
Solt et al.

(10) Patent No.: US 10,066,732 B2
(45) Date of Patent: Sep. 4, 2018

(54) SYSTEM AND METHOD FOR HEATING VEHICLE TRANSMISSION FLUID WITH A CLUTCH

(71) Applicants: Michael B Solt, Oxford, MI (US); Berthold Martin, Shelby Township, MI (US)

(72) Inventors: Michael B Solt, Oxford, MI (US); Berthold Martin, Shelby Township, MI (US)

(73) Assignee: FCA US LLC, Auburn Hills, MI (US)

( * ) Notice: Subject to any disclaimer, the term of this patent is extended or adjusted under 35 U.S.C. 154(b) by 93 days.

(21) Appl. No.: 15/182,802

(22) Filed: Jun. 15, 2016

(65) Prior Publication Data

US 2017/0219082 A1 Aug. 3, 2017

Related U.S. Application Data

(60) Provisional application No. 62/290,175, filed on Feb. 2, 2016.

(51) Int. Cl.
*F16H 57/04* (2010.01)
*F16H 3/66* (2006.01)
(Continued)

(52) U.S. Cl.
CPC ......... *F16H 57/0413* (2013.01); *F16D 21/00* (2013.01); *F16D 48/062* (2013.01);
(Continued)

(58) Field of Classification Search
CPC ............. F16H 57/0413; F16H 57/0412; F16D 48/062; F16D 21/00; F16D 2500/1045
See application file for complete search history.

(56) References Cited

U.S. PATENT DOCUMENTS 4,405,039 A 9/1983 Hauser
6,752,738 B1 6/2004 Martin et al.
(Continued)

FOREIGN PATENT DOCUMENTS

DE 10342893 A1 5/2005
WO 2009106409 A1 9/2009

OTHER PUBLICATIONS

Lutz Gaertner et al., "The ZF Automatic Transmission 9HP48 Transmission System, Design and Mechanical Parts", SAE International Journal of Passenger Cars—Mechanical Systems, vol. 6, No. 2, May 20, 2013, pp. 908-917, XP055214630, ISSN: 1946-4002, DOI: 10.4271/2013-01-1276 figures 3, 5.
(Continued)

*Primary Examiner* — Stacey A Fluhart
(74) *Attorney, Agent, or Firm* — Ralph E. Smith

(57) ABSTRACT

An automatic transmission system includes a housing containing automatic transmission fluid (ATF), a plurality of clutches configured to be engaged to generate gear ratios corresponding to forward speeds of the automatic transmission, wherein one clutch of the plurality of clutches is a friction clutch movable between a disengaged state, an engaged state utilized to create one or more gear ratios of the automatic transmission, and a slippingly engaged state between the disengaged state and the engaged state where the friction clutch is not engaged to create a gear ratio of the automatic transmission, and a controller configured to selectively move the friction clutch to the slippingly engaged state when the friction clutch is not being utilized to generate the one or more gear ratios, such that the friction clutch generates heat from friction to thereby rapidly heat the ATF in the housing and improve operating efficiency of the transmission.

15 Claims, 5 Drawing Sheets

(51) Int. Cl.
*F16D 48/06* (2006.01)
*F16D 21/00* (2006.01)
*F16D 25/12* (2006.01)
*F16H 57/08* (2006.01)
*F16H 3/44* (2006.01)

(52) U.S. Cl.
CPC ........... *F16H 3/66* (2013.01); *F16H 57/0409* (2013.01); *F16H 57/0484* (2013.01); *F16D 25/12* (2013.01); *F16D 2500/1045* (2013.01); *F16D 2500/10412* (2013.01); *F16D 2500/10462* (2013.01); *F16D 2500/30803* (2013.01); *F16D 2500/506* (2013.01); *F16D 2500/5043* (2013.01); *F16H 57/08* (2013.01); *F16H 2003/442* (2013.01); *F16H 2057/087* (2013.01); *F16H 2200/0065* (2013.01); *F16H 2200/2012* (2013.01); *F16H 2200/2046* (2013.01); *F16H 2200/2064* (2013.01); *F16H 2200/2094* (2013.01)

(56) References Cited

U.S. PATENT DOCUMENTS

| | | |
|---|---|---|
| 7,410,446 B2 | 8/2008 | DeMarco |
| 7,556,582 B2 | 7/2009 | Gumpoltsberger |
| 7,670,260 B2 * | 3/2010 | DeMarco ............ B60W 30/194 |
| | | 477/98 |
| 7,789,792 B2 | 9/2010 | Kamm et al. |
| 8,398,522 B2 | 3/2013 | Bauknecht et al. |
| 8,663,066 B2 | 3/2014 | Thomas et al. |
| 8,721,483 B2 | 5/2014 | Ziemer et al. |
| 8,858,393 B2 | 10/2014 | Nogle |
| 9,086,146 B2 * | 7/2015 | Arnold ................... F16H 61/16 |
| 2007/0062777 A1 * | 3/2007 | Zagrodzki ............ F16D 13/648 |
| | | 192/70.2 |
| 2011/0009229 A1 | 1/2011 | Bauknecht et al. |
| 2011/0009299 A1 | 1/2011 | Zanten |
| 2011/0155714 A1 * | 6/2011 | Thomas ................... B60L 1/12 |
| | | 219/205 |
| 2013/0288847 A1 | 10/2013 | Scherer et al. |
| 2014/0129119 A1 | 5/2014 | Park |
| 2014/0236438 A1 | 8/2014 | Arnold et al. |
| 2016/0084371 A1 * | 3/2016 | Gooden .............. F16H 61/0006 |
| | | 701/51 |

OTHER PUBLICATIONS

International Search Report and Written Opinion dated Apr. 13, 2017 for International Application No. PCT/US2017/013004, International Filing Date Jan. 11, 2017.

* cited by examiner

| GEAR | BRAKE/CLUTCH | | | | DOG CLUTCH | | RATIO | RATIO/STEPS |
|---|---|---|---|---|---|---|---|---|
| | C | D | B | E | F | A | | |
| 1 | | ○ | | | ○ | ○ | 4.70 | |
| 2 | ○ | □ | | | ○ | ○ | 2.84 | 1.65 |
| 3 | | □ | ○ | | ○ | ○ | 1.90 | 1.49 |
| 4 | | □ | | ○ | ○ | ○ | 1.38 | 1.38 |
| 5 | ○ | □ | ○ | ○ | | ○ | 1.00 | 1.38 |
| 6 | ○ | □ | | ○ | | ○ | 0.80 | 1.24 |
| 7 | | ○ | | ○ | | ○ | 0.70 | 1.16 |
| 8 | | ○ | ○ | ○ | | | 0.58 | 1.21 |
| 9 | | ○ | ○ | ○ | | | 0.48 | 1.21 |
| R | | ○ | | | ○ | | -3.80 | TOTAL 9.81 |

FIG. 4

SYSTEM AND METHOD FOR HEATING VEHICLE TRANSMISSION FLUID WITH A CLUTCH

CROSS REFERENCE TO RELATED APPLICATION

This application claims the benefit of U.S. Provisional Application Ser. No. 62/290,175, filed Feb. 2, 2016, the contents of which are incorporated herein by reference thereto.

FIELD

The present application relates generally to an automatic transmission for a vehicle and, more particularly, to system and method for heating automatic transmission fluid using a clutch to improve efficiency of the transmission and fuel economy of an associated motor vehicle.

BACKGROUND

Operating at or near the transmission operating temperature (e.g., approximately 90-100° C.) can have a notable impact on fuel economy of the vehicle, such as during driving scenarios similar to the FTP emissions test cycle. During such driving scenarios, the automatic transmission fluid (ATF) temperature typically does not approach operating temperature, which reduces transmission efficiency and lowers fuel economy. Some systems have been proposed to heat the ATF with engine coolant waste heat or with electric heaters, to thereby provide additional heating to the ATF and more quickly achieve the operating temperature. However, such systems may be complicated and expensive. Accordingly, while such systems work for their intended purpose, it is desirable to provide improved supplemental ATF heating in an automatic transmission.

SUMMARY

In accordance with one example aspect of the invention, an automatic transmission system is provided. In one exemplary implementation, the system includes a housing containing automatic transmission fluid (ATF), a plurality of clutches configured to be engaged in various combinations to generate gear ratios corresponding to forward speeds of the automatic transmission. One clutch of the plurality of clutches is a friction clutch configured to be movable between a disengaged state, an engaged state utilized to generate one or more of the gear ratios of the automatic transmission, and a slippingly engaged state. The slippingly engaged state includes a predetermined position of partial engagement of the friction clutch between that of the disengaged state and the engaged state such that the friction clutch is not engaged generate gear ratios of the automatic transmission. A controller is configured to selectively move the friction clutch to the slippingly engaged state when the friction clutch is not being utilized to generate the one or more gear ratios, such that the friction clutch generates heat from friction to thereby rapidly heat the ATF in the housing to improve the operating efficiency of the automatic transmission.

In addition to the foregoing, in one exemplary implementation, the controller is configured to move the friction clutch to the slippingly engaged state when a temperature of the ATF is below a predetermined temperature and the friction clutch is not being utilized to generate a forward gear ratio. The controller is also configured to, in an exemplary implementation, prevent the friction clutch from moving to the slippingly engaged state when a temperature of the ATF is above a second predetermined temperature greater than the predetermined temperature.

In an exemplary implementation, the automatic transmission is a nine-speed automatic transmission, and the controller is configured to move the friction clutch to the slippingly engaged state when the automatic transmission is in $2^{nd}$ through $6^{th}$ gears.

In one exemplary implementation, the friction clutch is a multi-plate clutch having a retainer and a clutch pack; wherein the retainer is grounded to the housing and the clutch pack includes alternating first and second friction discs. In this exemplary implementation, the first friction discs are coupled to a shaft and configured to rotate therewith, and the second friction discs are grounded to the transmission housing through the retainer. In an exemplary implementation, the friction clutch is a first clutch, and the plurality of clutches further includes a second clutch, a third clutch, a fourth clutch, a fifth clutch, and a sixth clutch. In this exemplary implementation, the first clutch, the fifth clutch, and the sixth clutch are brake clutches; the second clutch and the sixth clutch are dog clutches; and the transmission system further comprising a hydraulic piston operably associated with the friction clutch and configured to move the friction clutch between the engaged state, the disengaged state, and the slippingly engaged state.

In accordance with another example aspect of the invention, a method of heating automatic transmission fluid (ATF) in an automatic transmission is provided. In one exemplary implementation, the automatic transmission has a housing containing the ATF, and a plurality of clutches configured to be engaged in various combinations to generate gear ratios corresponding to forward speeds of the automatic transmission. The method includes, in an exemplary implementation, moving a friction clutch of the plurality of clutches to an engaged state when the automatic transmission is in a first gear, the friction clutch of the plurality of clutches being selectively movable between a disengaged state, the engaged state where the friction clutch is utilized to generate one or more of the gear ratios of the automatic transmission, and a slippingly engaged state where the friction clutch is commanded to a position of partial engagement between that of the disengaged state and the engaged state such that the friction clutch is not engaged to generate gear ratios of the automatic transmission. The method further includes moving the friction clutch to the slippingly engaged state when the friction clutch is not being utilized to generate the one or more gear ratios, such that the friction clutch generates heat from friction; and heating the ATF in the housing from the heat generated by the friction clutch being in the slippingly engaged state to improve operating efficiency of the automatic transmission.

In addition to the foregoing, the method includes, in an exemplary implementation, moving the friction clutch to the slippingly engaged state when a temperature of the ATF is below a predetermined temperature, and preventing the friction clutch from moving to the slippingly engaged state when a temperature of the ATF is above a second predetermined temperature greater than the predetermined temperature. In one exemplary implementation, the method includes moving the friction clutch to the slippingly engaged state only between $2^{nd}$ through $6^{th}$ gears of the automatic transmission.

BRIEF DESCRIPTION OF DRAWINGS

FIG. 4 is a view of a table illustrating engagement of various transmission clutches in connection with shifting of various transmission gears in accordance with the principles of the present application.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

As briefly mentioned above, the present application is directed to a system and method for improving vehicle fuel economy with an automatic transmission. In one exemplary implementation, the present application relates to an improved system and method for frictionally engaging a clutch element to generate heat and rapidly warm up automatic transmission fluid (ATF) of an automatic transmission. Accordingly, the temperature of the transmission approaches or reaches a transmission operating temperature more quickly than with typical automatic transmissions. In one exemplary implementation, the clutch element is a brake clutch or friction clutch. Moreover, the present system only utilizes clutches directed toward facilitating shifting of transmission gears to heat the ATF. Thus, additional parts and components are not required to heat the ATF, thereby reducing cost, weight, and complexity of the automatic transmission.

Figure 1:
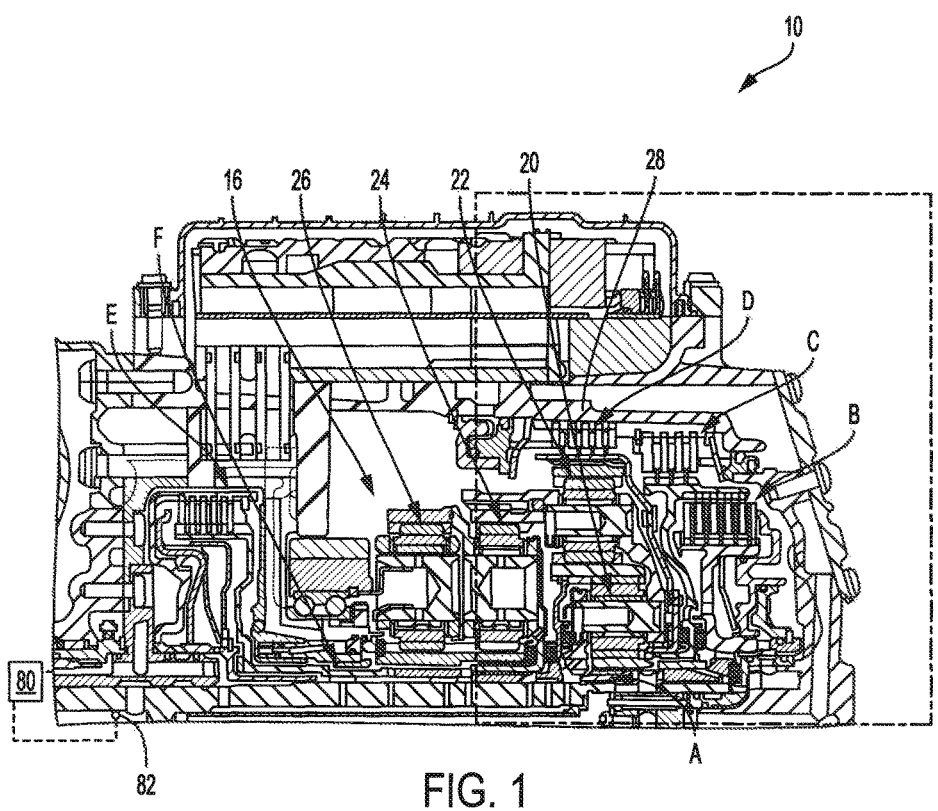
FIG. 1 is a partial cross-sectional view of an exemplary motor vehicle automatic transmission in accordance with the principles of the present application.
Figure 2:
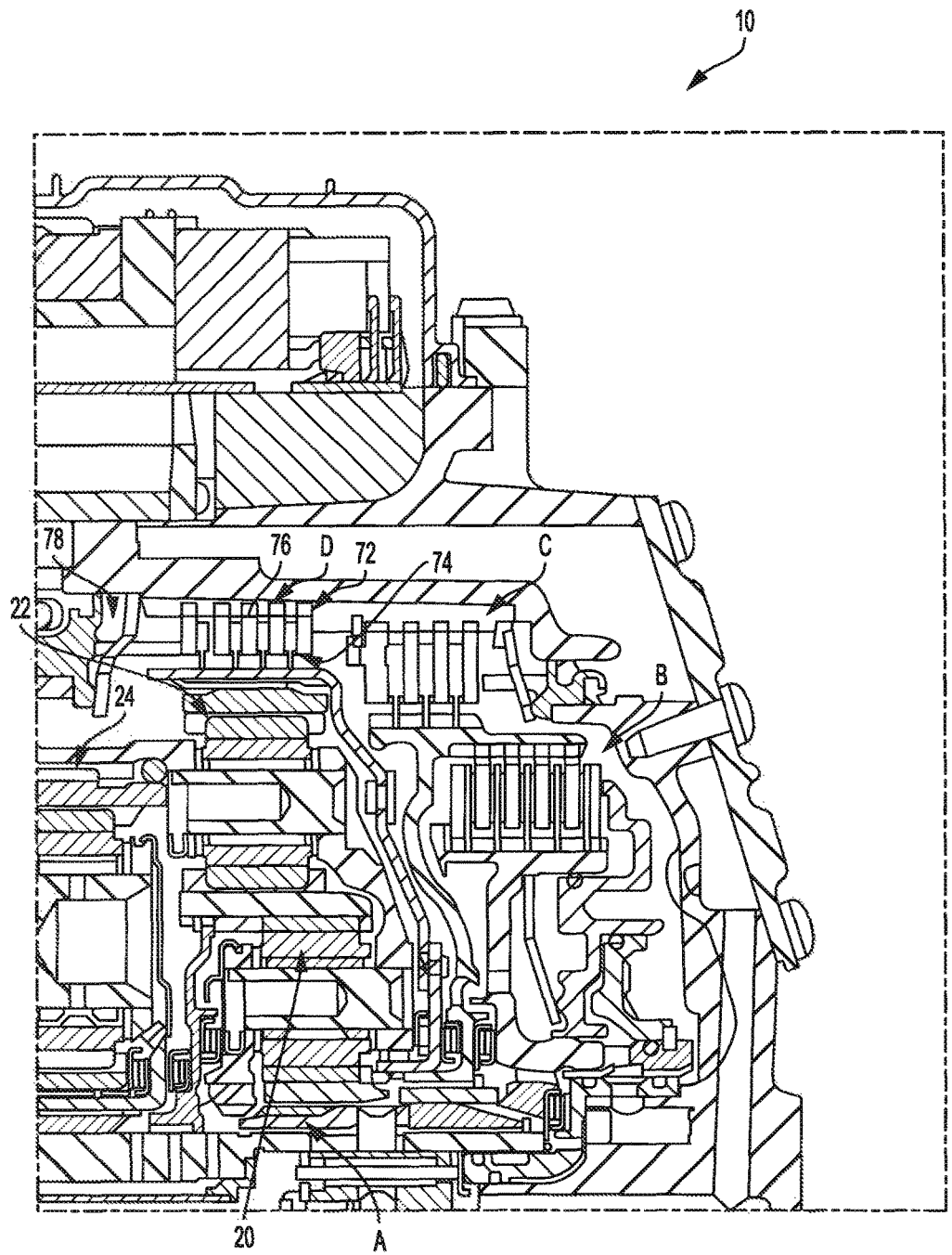
FIG. 2 is an enlarged view of a portion of the cross-sectional view of the exemplary automatic transmission of FIG. 1 and illustrating a brake clutch D in accordance with the principles of the present application.
Figure 3:
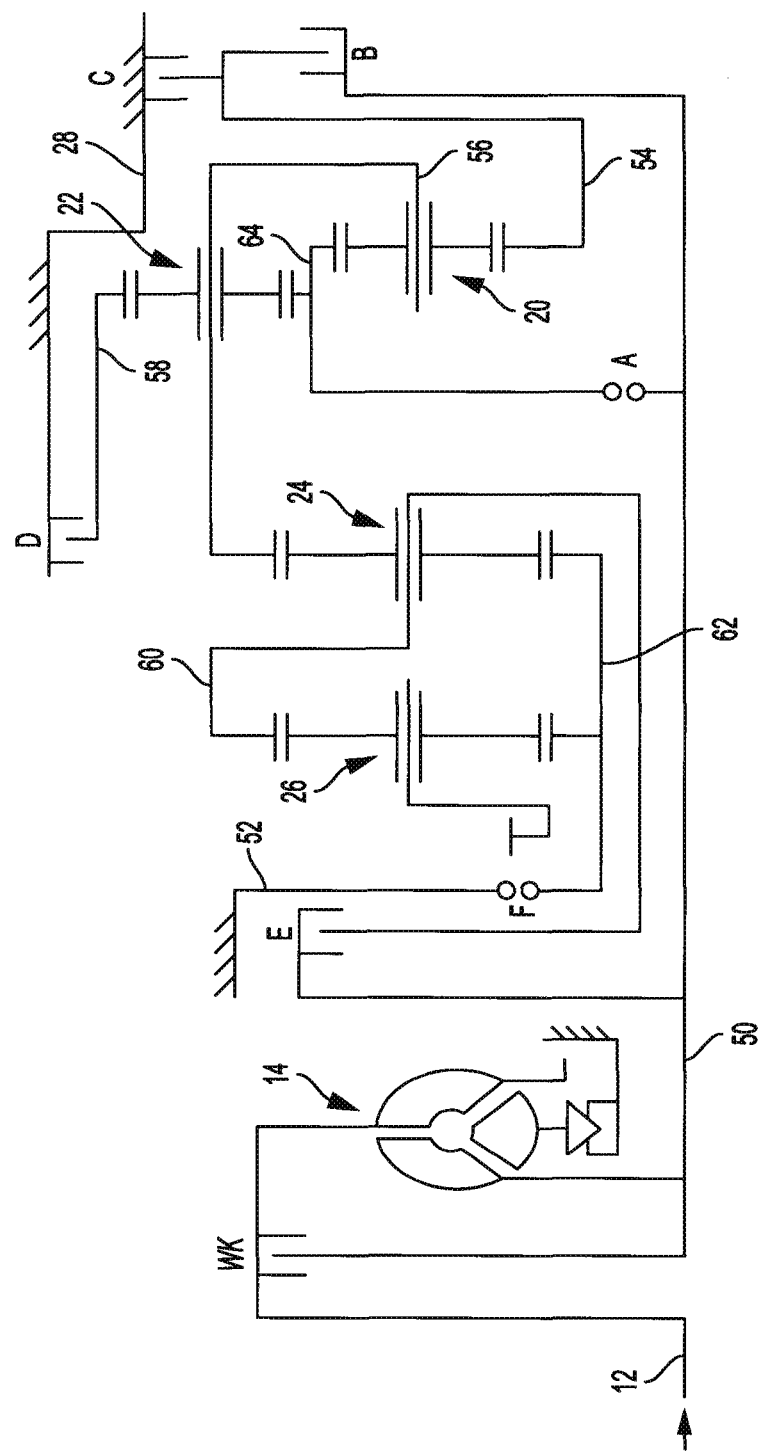
FIG. 3 is a partial schematic illustration of the exemplary automatic transmission of FIG. 1 in accordance with the principles of the present application.

Referring to FIGS. 1-3, a nine-speed automatic transmission system for use in a motor vehicle is generally shown and indicated at reference numeral 10. However, it will be appreciated that the systems and methods described herein are not limited to nine-speed automatic transmissions and may be utilized in other transmissions such as, for example, an eight-speed automatic transmission. The nine-speed automatic transmission 10 is coupled to an engine (not shown) through an engine output shaft 12 (FIG. 3). Rotational output from the engine output shaft 12 is received by the automatic transmission 10 through a torque converter assembly 14. The torque converter assembly 14 then transfers the rotational output through a gear set 16 to a transmission output shaft 52, and then on to the drivetrain of the motor vehicle.

The gear set 16 of the exemplary automatic transmission 10 includes a first planetary gear set 20, a second planetary gear set 22, a third planetary gear set 24, a fourth planetary gear set 26, and a housing 28. The first and second planetary gear sets 20, 22 may form a shiftable front-mounted gear set, and the third and fourth planetary gear sets 24, 26 may form a main gear set.

With particular reference to FIG. 3, in the exemplary implementation, the automatic transmission 10 comprises six shift elements including three clutches and three brakes. In particular, automatic transmission 10 includes a first clutch A, a second clutch B, a third clutch E, and a fourth clutch F, as well as a first brake/clutch C and a second brake/clutch D. In the example nine-speed automatic transmission 10, selective shifting of nine forward gears and one reverse gear are accomplished with the six shift elements.

Clutches A and/or F are, in the exemplary implementation illustrated, designed as locking shift elements or dog clutch elements. In one exemplary implementation, the dog clutch A and/or F and associated components include a male externally splined clutch member, a female internally splined clutch member configured to receive the male clutch member for engagement of the dog clutch A or F, a piston, a sensing sleeve and associated sensor(s) and fluid passages. In this exemplary implementation, the male externally splined clutch member is coupled to the dog clutch piston.

In one exemplary implementation, the automatic transmission 10 includes eight rotatable shafts 50, 52, 54, 56, 58, 60, 62, and 64, as illustrated in FIG. 3. The clutches A, B, and E are each selectively engageable to receive torque input from the torque converter assembly 14 via transmission input shaft 50. The carriers of the first and second planetary gear sets 20, 22 are coupled together by shaft 56, which is connected to the ring gear of the third planetary gear set 24. The ring gear of the first planetary gear set 20 is coupled to the sun gear of the second planetary gear set 22 through shaft 64, which is selectively coupled to the input shaft 50 by clutch A.

The sun gear of the first planetary gear set 20 is coupled to housing 28 through shaft 54 and the brake clutch C. The first planetary gear set 20 may be selectively coupled to the transmission input shaft 50 through dog clutch A. The ring gear of the second planetary gear set 22 is coupled to the housing 28 through shaft 58 and brake clutch D. As described herein in more detail, brake clutch D is selectively utilized to generate heat within the transmission to increase the temperature of the ATF, which thereby increases transmission efficiency and improves vehicle fuel economy.

In the exemplary implementation, shaft 60 is coupled to the ring gear of the fourth planetary gear set 26 and to the carrier of the third planetary gear set 24. The shaft 60 is selectively coupled to the transmission input shaft 50 and clutch E, while shaft 62 is coupled to the sun gears of the third and fourth planetary gear sets 24, 26. The shaft 62 is coupled to transmission housing 28 through dog clutch F. The output shaft 52, which produces output drive for the vehicle, is coupled to the carrier of the fourth planetary gear set 26.

FIG. 4 illustrates an exemplary shift pattern of the nine-speed automatic transmission 10. The table illustrates the combination of clutches and brakes engageable to achieve specific torque input-to-output ratios. In the example table, each clutch and brake combination corresponds to one of nine forward gear speeds and a reverse speed. The shift pattern illustrates example transmission ratios of the individual gear steps, as well as the gear increments and step changes. In this particular transmission, three shift elements are engaged for every gear, as represented by the circles in the table cells. Moving four shift elements at one time to an engaged state will lock power flow of the transmission.

However, in the example implementation, brake clutch D is additionally and selectively slightly engaged (less than its engaged state) in gears 2-6 (represented by the squares in the table cells). This selective, slight or partial engagement of clutch D in any of $2^{nd}$ through $6^{th}$ gears generates heat from friction, which is subsequently utilized to rapidly heat the ATF, as discussed below in greater detail following a brief discussion of exemplary structure and operation of transmission 10.

Figure 5:
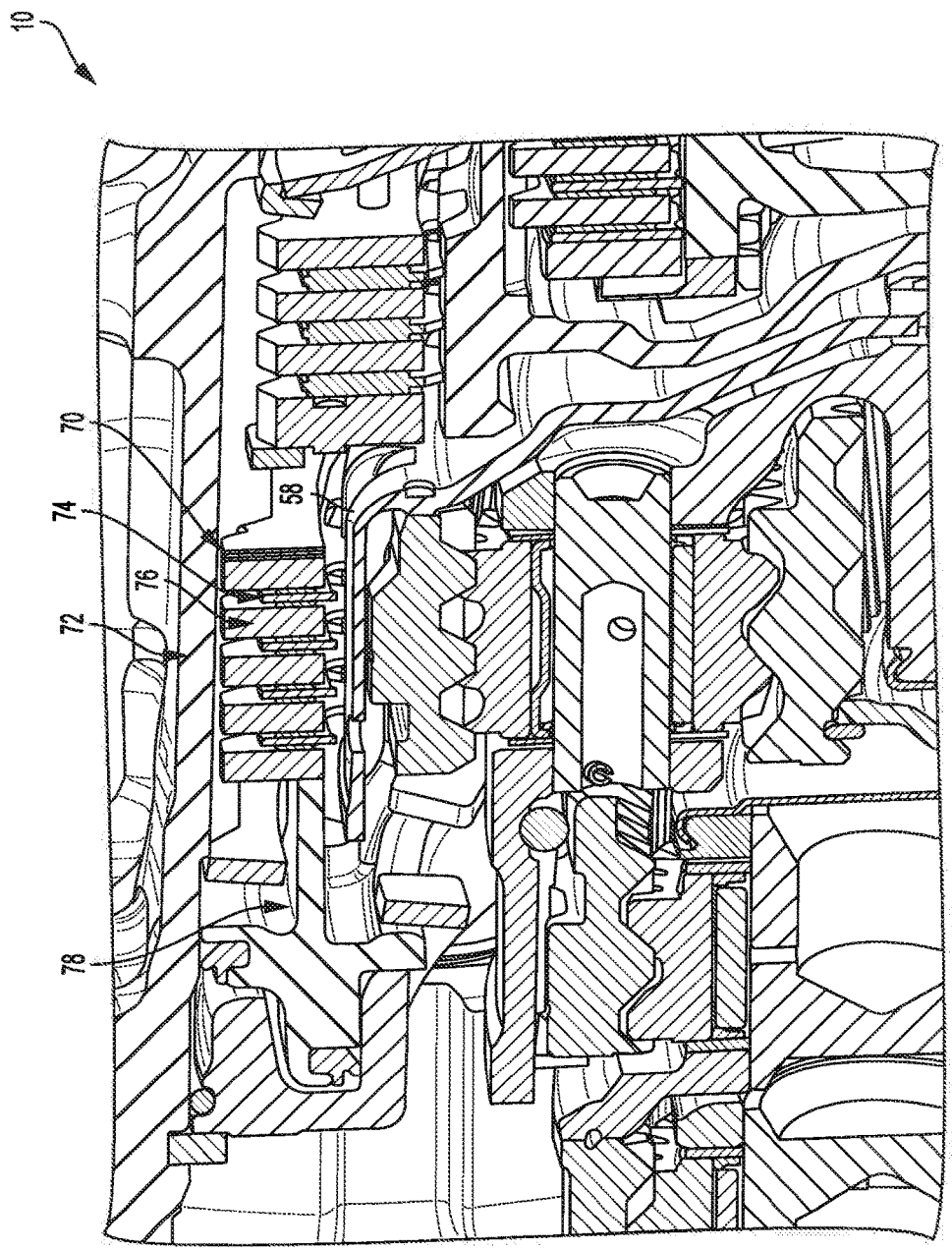
FIG. 5 is a perspective sectional view of an example brake clutch D of the transmission shown in FIG. 1 in accordance with the principles of the present application.

With reference to FIGS. 2 and 5, brake clutch D is a multi-plate clutch having a housing or retainer 70 and a clutch pack 72. The retainer 70 is grounded to the transmission housing 28, and the clutch pack 72 includes alternating first and second sets of friction discs 74, 76. The first friction discs 74 are coupled to shaft 58, and the second friction discs 76 are grounded to transmission housing 28 through the retainer 70. When brake clutch D is disengaged, the first friction discs 74 rotate freely with shaft 58. When brake clutch D is engaged, for example through pressure applied by a hydraulic piston 78 (FIGS. 2 and 5), first friction discs 74 engage the grounded second friction discs 76, which prevents rotation of discs 74 and shaft 58. For example, brake clutch D may be engaged in gears 1 and 7-9, as shown in FIG. 4.

As mentioned above, brake clutch D may be placed in a partially or slightly engaged state where the first friction discs 74 slippingly contact the second friction discs 76. However, unlike the fully engaged state (i.e., grounded state) in gears 1 and 7-9, first friction discs 74 continue to rotate, which prevents a fourth shift element being engaged and a transmission lock-up. For example, by only partially applying or extending the hydraulic piston 78 in gears 2-6 (i.e., where brake clutch D is normally in the disengaged state), first friction discs 74 may be positioned at or just slightly beyond the "kiss" point by command of a controller, where first frictions discs 74 initially contact the second friction discs 76. As such, friction discs 74 and 76 may be in contact with each other, but relative rotation is permitted therebetween, thus preventing the lock-up condition.

A controller 80 is in signal communication with transmission 10 and includes shifting logic to slightly engage brake clutch D (i.e., allow friction/drag) while the transmission is in one or more of gears 2-6 when clutch D is typically "off" or not engaged or utilized to achieve power flow for gears 2-6. In this particular arrangement, clutch D is chosen to generate the supplemental heat because brake clutch D is the largest clutch in the transmission 10 and will generate the most heat when in the slightly engaged state. However, such partial engagement logic control is not limited to brake clutch D, and may be utilized with various other clutches such as, for example, brake clutch C.

Moreover, clutch D may be commanded by controller 80 to move to the slippingly engaged state when a temperature of the ATF is below a predetermined temperature (e.g., during startup), as monitored by one or more sensors 82 in signal communication with controller 80. In addition, clutch D may be controlled by controller 80 to disengage from the slippingly engaged state during gears 2-6 when controller 80 senses the ATF fluid has reached a second predetermined temperature greater than the predetermined temperature discussed above. However, clutch D may be prevented from moving to the slippingly engaged position when various other conditions are satisfied such as, for example, when a predetermined amount of time has elapsed after a vehicle startup. As such, controller 80 may monitor ATF temperature and time elapsed following engine start-up.

Moreover, it will be appreciated that slight, momentary slipping of clutches when being engaged to generate forward gears of a transmission is fundamentally different than the slippingly engaged state discussed herein, where a clutch that is not currently being utilized to generate a forward gear is specifically positioned at a predetermined position at or slightly beyond the kiss point and maintained in this position for a predetermined period of time and/or until the ATF reaches the second predetermined temperature higher than the first predetermined temperature. This slippingly engaged state of the clutch is independent and separate from the clutch being utilized to generate gear ratios of the transmission.

In this slippingly engaged position of clutch D, the first friction discs 74 continue to rotate while contacting the second friction discs 76, which prevents a fourth shift element being engaged as noted above. More importantly though, this frictional contact between discs 74, 76 generates heat within the transmission 10. Thus, when slightly engaged, the brake clutch D acts as a heat source in the transmission 10 to achieve a higher temperature therein. Such additional heat generation causes a supplemental warming of the ATF contained within the transmission housing 28, thereby causing a rapid increase in ATF temperature compared to a transmission without the partially engaged brake clutch D.

Use of an existing clutch (e.g., clutch D) to warm the ATF as compared to conventional methods of waste heat, supplemental heaters, etc., reduces cost, weight, and complexity. Thus, transmission 10 does not require such additional conventional methods or a supplemental heater and only includes existing clutch elements utilized for shifting the transmission 10.

This increase in ATF temperature thus enables the transmission 10 to more quickly approach or reach normal transmission operating temperature, which improves fuel economy by more quickly reducing the viscosity of the ATF. Accordingly, positioning brake clutch D in the slightly engaged state effectively creates a heat source in the transmission to achieve a higher temperature, particularly during the FTP cycle and similar driving scenarios. While operation of brake clutch D in this manner may slightly reduce transmission efficiency, the increase in efficiency extracted from the transmission by rapidly heating the ATF improves the overall efficiency of the transmission and increases vehicle fuel economy.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An automatic transmission system comprising:
a housing containing automatic transmission fluid (ATF);
a plurality of clutches configured to be engaged in various combinations to generate gear ratios corresponding to $1^{st}$ through $6^{th}$ gear forward speeds of the automatic transmission, wherein the $1^{st}$ gear has the highest gear ratio of the forward speeds, and wherein the gear ratios of the forward speeds decrease from the $1^{st}$ gear to the $6^{th}$ gear, and;

one clutch of the plurality of clutches being a friction clutch configured to be movable between a disengaged state, an engaged state utilized to generate one or more of the gear ratios of the automatic transmission, and a slippingly engaged state, the slippingly engaged state including a predetermined position of partial engagement of the friction clutch between that of the disengaged state and the engaged state such that friction clutch is not engaged to generate one or more gear ratios of the automatic transmission; and a controller configured to selectively maintain the friction clutch in the slippingly engaged state only when the automatic transmission is in the $2^{nd}$ through $6^{th}$ gears and the friction clutch is not being utilized to generate the one or more gear ratios, such that the friction clutch generates heat from friction to thereby rapidly heat the ATF in the housing to improve operating efficiency of the automatic transmission.

2. The automatic transmission of claim 1, wherein the controller is configured to move the friction clutch to the slippingly engaged state when the friction clutch is not being utilized to generate gear ratios and when a temperature of the ATF is below a predetermined temperature.

3. The automatic transmission of claim 2, wherein the controller is configured to prevent the friction clutch from moving to the slippingly engaged state when a temperature of the ATF is above a second predetermined temperature greater than the predetermined temperature.

4. The automatic transmission of claim 1, wherein the automatic transmission is a nine-speed automatic transmission having $1^{st}$ through $9^{th}$ gear forward speeds.

5. The automatic transmission of claim 1, wherein the friction clutch is a multi-plate clutch having a retainer and a clutch pack.

6. The automatic transmission of claim 5, wherein the retainer is grounded to the housing and the clutch pack includes alternating first and second friction discs.

7. The automatic transmission of claim 6, wherein the first friction discs are coupled to a shaft and configured to rotate therewith, and the second friction discs are grounded to the transmission housing through the retainer.

8. The automatic transmission of claim 1, wherein the friction clutch is a first clutch, and the plurality of clutches further includes a second clutch, a third clutch, a fourth clutch, a fifth clutch, and a sixth clutch.

9. The automatic transmission of claim 8, wherein the first clutch, the fifth clutch, and the sixth clutch are brake clutches.

10. The automatic transmission of claim 9, wherein the second clutch and the sixth clutch are dog clutches.

11. The automatic transmission of claim 10, further comprising a hydraulic piston operably associated with the friction clutch and configured to move the friction clutch between the engaged state, the disengaged state, and the slippingly engaged state.

12. The automatic transmission of claim 1, wherein the gear ratio of the $1^{st}$ gear is greater than the gear ratio of the $2^{nd}$ gear, which is greater than the gear ratio of the $3^{rd}$ gear, which is greater than the gear ratio of the $4^{th}$ gear, which is greater than the gear ratio of the $5^{th}$ gear, which is greater than the gear ratio of the $6^{th}$ gear.

13. A method of heating automatic transmission fluid (ATF) in an automatic transmission having a housing containing the ATF, and a plurality of clutches configured to be engaged in various combinations to generate gear ratios corresponding to $1^{st}$ through $6^{th}$ gear forward speeds of the automatic transmission, wherein the 1st gear has the highest gear ratio of the forward speeds, and wherein the gear ratios of the forward speeds decrease from the $1^{st}$ gear to the $6^{th}$ gear, the method comprising;

moving a friction clutch of the plurality of clutches to an engaged state when the automatic transmission is in the $1^{st}$ gear, the friction clutch of the plurality of clutches being movable between a disengaged state, the engaged state where the friction clutch is utilized to generate one or more of the gear ratios of the automatic transmission, and a slippingly engaged state where the friction clutch is commanded to a position of partial engagement between that of the disengaged state and the engaged state such that the friction clutch is not engaged to generate gear ratios of the automatic transmission in the slippingly engaged state;

while the vehicle is traveling and only when the automatic transmission is in the $2^{nd}$ through $6^{th}$ gears, maintaining the friction clutch in the slippingly engaged state to generate heat from friction when the friction clutch is not being utilized to generate one or more of the gear ratios; and heating the ATF in the housing from the heat generated by the friction clutch being in the slippingly engaged state to improve operating efficiency of the automatic transmission.

14. The method of claim 13, further comprising moving the friction clutch to the slippingly engaged state when a temperature of the ATF is below a predetermined temperature.

15. The method of claim 14, further comprising preventing the friction clutch from moving to the slippingly engaged state when a temperature of the ATF is above a second predetermined temperature greater than the predetermined temperature.

* * * * *